United States Patent
Aiba et al.

(10) Patent No.: US 10,236,983 B2
(45) Date of Patent: Mar. 19, 2019

(54) COMMUNICATION SYSTEM

(71) Applicant: Yazaki Corporation, Tokyo (JP)

(72) Inventors: Takamitsu Aiba, Kanagawa (JP); Tomohiro Wakabayashi, Kanagawa (JP); Kenji Shirasu, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/985,350

(22) Filed: May 21, 2018

(65) Prior Publication Data

US 2018/0343060 A1 Nov. 29, 2018

(30) Foreign Application Priority Data

May 24, 2017 (JP) ................................ 2017-102370

(51) Int. Cl.
| | |
|---|---|
| *G02B 6/42* | (2006.01) |
| *H01Q 1/32* | (2006.01) |
| *H04B 1/3822* | (2015.01) |
| *H04B 10/2581* | (2013.01) |

(52) U.S. Cl.
CPC ....... *H04B 10/2581* (2013.01); *G02B 6/4279* (2013.01); *H01Q 1/32* (2013.01); *H04B 1/3822* (2013.01)

(58) Field of Classification Search
None
See application file for complete search history.

(56) References Cited

U.S. PATENT DOCUMENTS

| | | |
|---|---|---|
| 5,600,333 A | 2/1997 | Justice et al. |
| 2002/0111149 A1 | 8/2002 | Shoki |
| 2015/0065067 A1 | 3/2015 | Sugimoto et al. |
| 2018/0191439 A1* | 7/2018 | Morser .............. H04B 10/2575 |

FOREIGN PATENT DOCUMENTS

| | | |
|---|---|---|
| EP | 1 363 352 A1 | 11/2003 |
| JP | 2015-046789 A | 3/2015 |

OTHER PUBLICATIONS

Extended European search report for the related European Patent Application No. 18172582.1 dated Sep. 28, 2018.

* cited by examiner

*Primary Examiner* — Jerry Rahll
(74) *Attorney, Agent, or Firm* — Kenealy Vaidya LLP

(57) ABSTRACT

A communication system includes a vehicle exterior antenna, an electro-optic converter, and a multimode optical fiber. The vehicle exterior antenna transmits and receives an electric signal to and from a cloud system in the exterior of a vehicle. The electro-optic converter is connected to the vehicle exterior antenna and converts an electric signal received by the vehicle exterior antenna into an optical signal. The multimode optical fiber has a plurality of propagation modes for propagation of optical signals and connects the electro-optic converter and an on-vehicle device (an opto-electric converter, an on-vehicle router, and the like) in the interior of the vehicle.

4 Claims, 7 Drawing Sheets

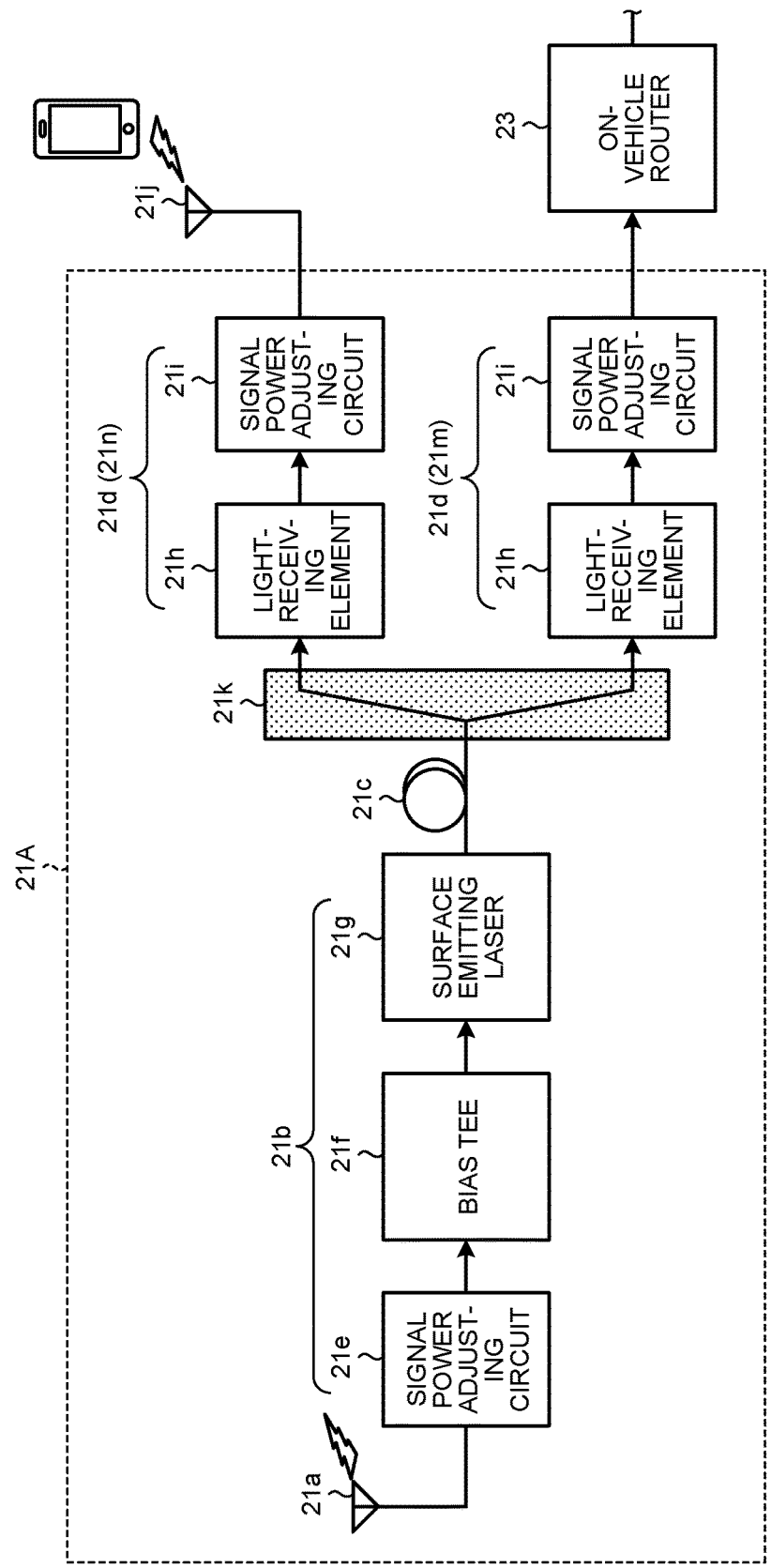

COMMUNICATION SYSTEM

CROSS-REFERENCE TO RELATED APPLICATION(S)

The present application claims priority to and incorporates by reference the entire contents of Japanese Patent Application No. 2017-102370 filed in Japan on May 24, 2017.

BACKGROUND OF THE INVENTION

1. Field of the Invention

The present invention relates to a communication system.

2. Description of the Related Art

There have conventionally been communication systems that transmit and receive signals. A communication system includes an antenna module provided on a top face of a roof of a vehicle, an on-vehicle device provided inside the vehicle, and a coaxial cable electrically connecting the antenna module and the on-vehicle device, for example (Japanese Patent Application Laid-open No. 2015-046789, for example). The conventional communication system receives a signal that has been wirelessly transmitted from a remote communication device at a place remote from the vehicle by the antenna module and transmits the signal to the on-vehicle device inside the vehicle via the coaxial cable, for example.

In the conventional communication system, when a high-frequency signal in the millimeter-wave region is transmitted by a coaxial cable, for example, the high-frequency signal may attenuate, and there is further room for improvement in transmitting and receiving signals between a communication device outside the vehicle and the on-vehicle device inside the vehicle.

SUMMARY OF THE INVENTION

The present invention has been made in view of the foregoing, and an object thereof is to provide a communication system that can appropriately transmit and receive signals between a communication device in the exterior of a structure and a device in the interior of the structure.

In order to solve the above mentioned problem and achieve the object, a communication system according to one aspect of the present invention includes an antenna that transmits and receives an electric signal to and from an object for communication in an exterior of a structure; a converter that is connected to the antenna and converts the electric signal received by the antenna into an optical signal or converts an optical signal into an electric signal and outputs the electric signal after being converted to the antenna; and a multimode optical fiber that connects the converter and a device in an interior of the structure and has a plurality of propagation modes for propagation of optical signals.

According to another aspect of the present invention, in the communication system, it is preferable that the device includes a transferring unit that relays an electric signal to and from an object for transfer provided in the interior, when the converter converts the electric signal into the optical signal, the device includes an opto-electric converter that is connected to the multimode optical fiber and the transferring unit, converts an optical signal output via the multimode optical fiber into an electric signal, and outputs the converted electric signal to the transferring unit, and when the converter converts the optical signal into the electric signal, the device includes an electro-optic converter that is connected to the transferring unit and the multimode optical fiber, converts an electric signal relayed by the transferring unit into an optical signal, and outputs the converted optical signal to the multimode optical fiber.

According to still another aspect of the present invention, in the communication system, it is preferable that the device includes an interior antenna that is provided in the interior and transmits and receives an electric signal, when the converter converts the electric signal into the optical signal, the device includes an opto-electric converter that is connected to the multimode optical fiber and the interior antenna, converts an optical signal output via the multimode optical fiber into an electric signal, and outputs the converted electric signal to the interior antenna, and when the converter converts the optical signal into the electric signal, the device includes an electro-optic converter that is connected to the interior antenna and the multimode optical fiber, converts an electric signal received by the interior antenna into an optical signal, and outputs the converted optical signal to the multimode optical fiber.

According to still another aspect of the present invention, in the communication system, it is preferable that the converter converts the electric signal into the optical signal without performing analog/digital conversion.

According to still another aspect of the present invention, in the communication system, it is preferable that the structure is a vehicle.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a block diagram of a configuration example of an RoF receiving device according to a modification.

DETAILED DESCRIPTION OF THE PREFERRED EMBODIMENTS

The following describes a mode (an embodiment) for performing the present invention in detail with reference to the accompanying drawings. The details described in the following embodiment do not limit the present invention. Components described below include ones that can be easily thought of by those skilled in the art and substantially the same ones. Furthermore, the components described below can be combined as appropriate. Various omissions, replacements, and modifications of the components can be made without departing from the gist of the present invention.

Embodiment

Figure 1:
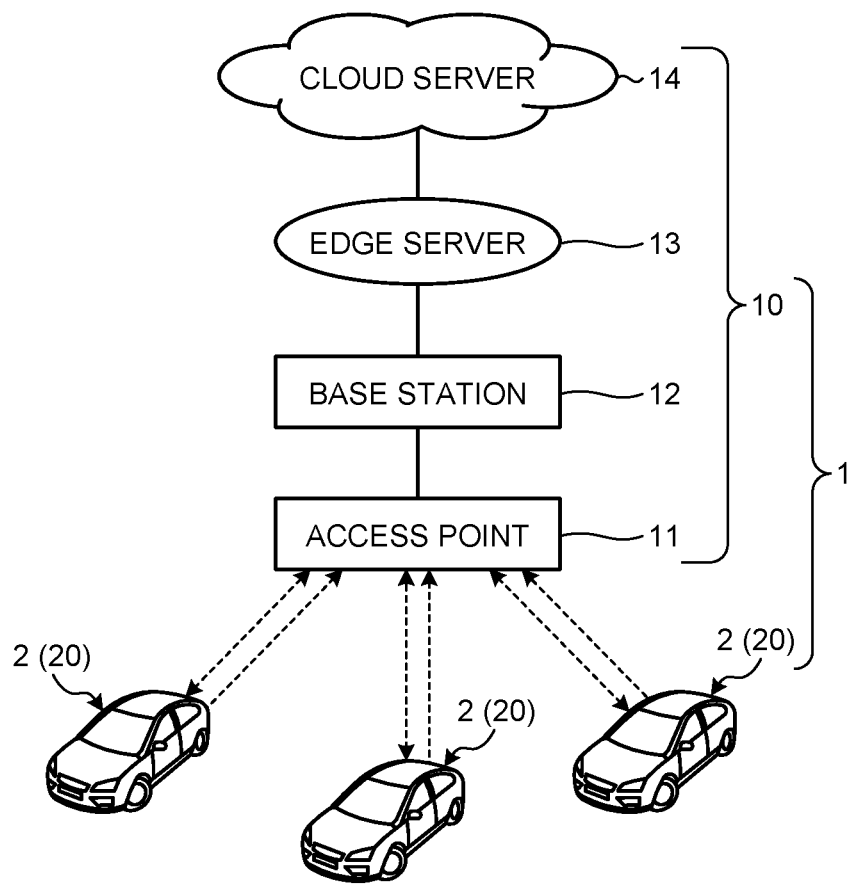
FIG. 1 is a conceptual diagram of a configuration example of a communication network system according to an embodiment.

The following describes a communication network system 1 according to the embodiment. The communication network system 1 is a system in which an on-vehicle device of a vehicle 2 as a structure and a server of a cloud perform wireless communication. As illustrated in FIG. 1, the communication network system 1 includes a cloud system 10 as an object for communication and a communication system 20 provided in the vehicle 2. The cloud system 10 is the fifth-generation mobile communication system (5G) that enables large capacity, low delay, and 24-hour Internet connection as a mobile network, for example, which performs wireless communication at a high frequency of about 6 GHz to about 90 GHz. The cloud system 10 includes an access point 11, a base station 12, an edge server 13, and a cloud server 14. The access point 11 determines the necessity or unnecessity of connection with the on-vehicle device provided in the vehicle 2. The access point 11 determines the necessity or unnecessity of the connection with the on-vehicle device by verifying a network identifier and a password, for example. The base station 12 relays radio waves. The base station 12 relays a radio wave of an on-vehicle device for which the connection has been allowed by the access point 11 or relays a radio wave transmitted from the edge server 13. The edge server 13 is a server provided closer to the user's side (the on-vehicle device's side) than the cloud server 14 and reduces the distance to the user to shorten communication delay. An edge server 113 performs processing with high precision by predictive analysis by artificial intelligence or a hi-spec central processing unit (CPU), for example. The edge server 113 performs processing on the monitoring of infrastructures such as roads, bridges, and tunnels, roadside and road surface data on construction, road surface conditions, and the like, information on the function stopping and control of the vehicle 2 using a high-performance, high-function vehicle exterior processing system, entertainment information, and information on autonomous driving, for example. The edge server 13 transmits a result obtained by processing the radio wave (hereinafter, also referred to as an electric signal, a reception signal, or a transmission signal) relayed by the base station 12 to the on-vehicle device or to the cloud server 14. The cloud server 14 performs arithmetic processing on the processed result transmitted from the edge server 13 and transmits its result to the edge server 13 and the like.

Figure 2:
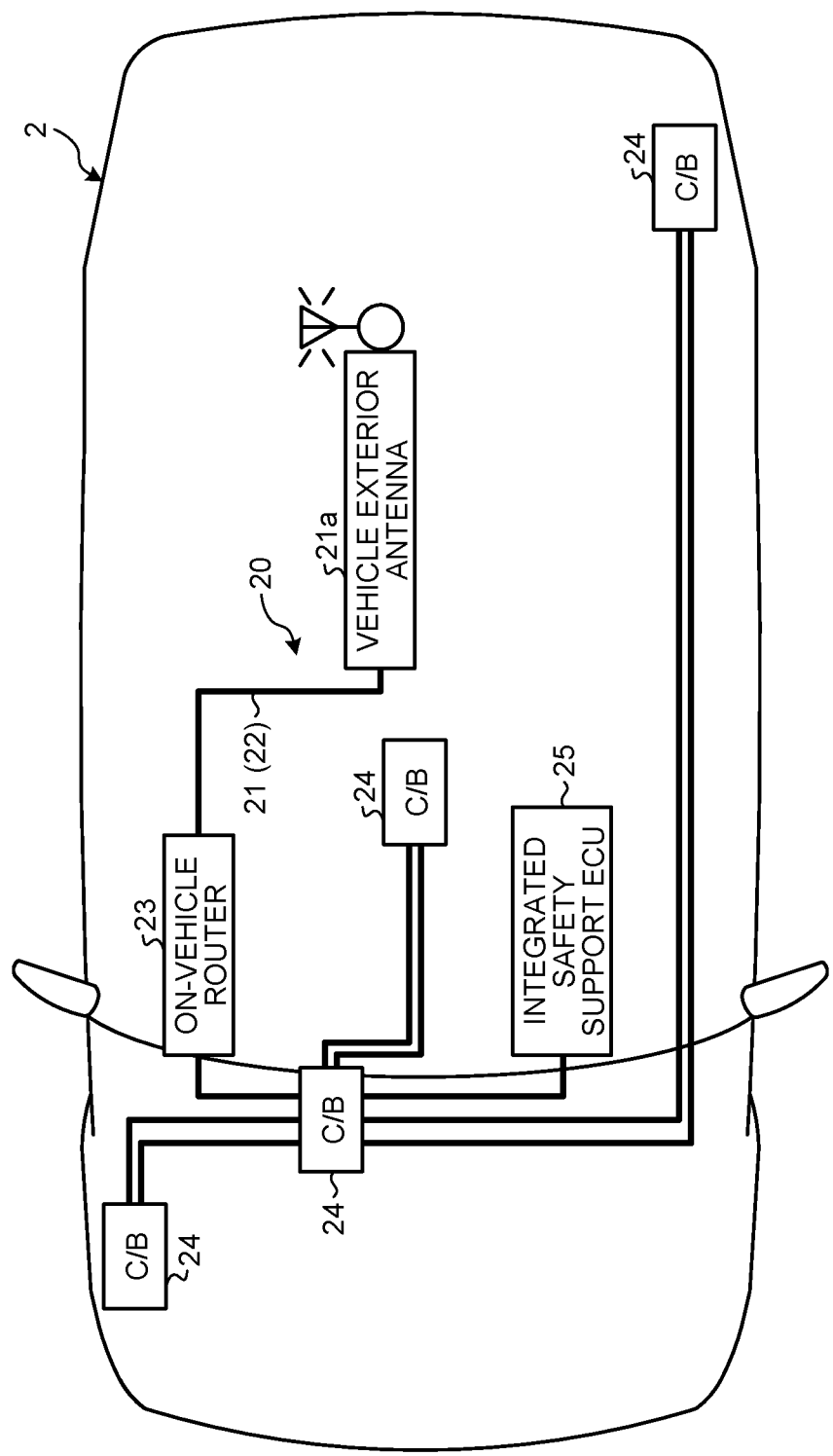
FIG. 2 is a conceptual diagram of a configuration example of a communication system according to the embodiment.

The communication system 20 is a system that transmits and receives radio waves (electric signals) transmitted from the cloud system 10. The radio wave transmitted from the cloud system 10 is a high frequency of about 6 GHz to about 90 GHz, and thus has strong directivity and the property of being shielded, and is difficult to directly reach the interior of the vehicle 2. Given these circumstances, the communication system 20 has a function of favorably delivering the high-frequency radio wave to the interior of the vehicle 2. As illustrated in FIG. 2, the communication system 20 includes a radio over fiber (RoF) receiving device 21, an RoF transmitting device 22, an on-vehicle router 23 as a transferring unit, a plurality of control boxes (C/Bs) 24, and an integrated safety support electronic control unit (ECU) 25.

Figure 3:
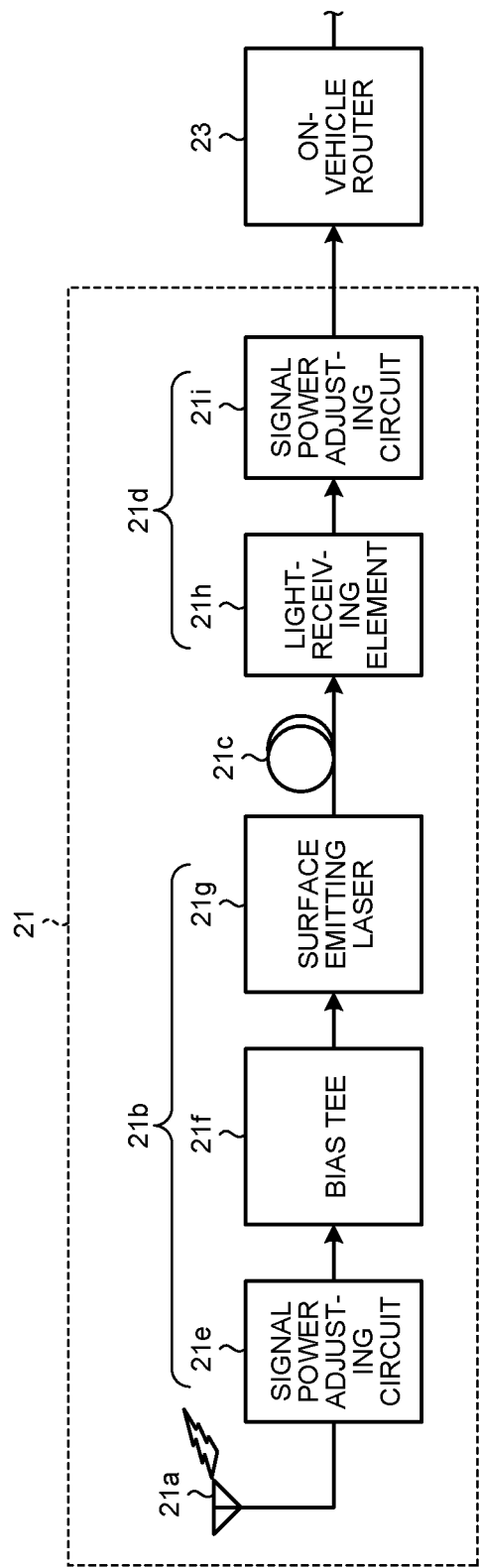
FIG. 3 is a block diagram of a configuration example of an RoF receiving device according to the embodiment.

The RoF receiving device 21 is an device that converts an electric signal from the exterior of the vehicle 2 into an optical signal and transmits the optical signal to the interior of the vehicle 2. As illustrated in FIG. 3, the RoF receiving device 21 includes a vehicle exterior antenna 21a as an antenna, an electro-optic converter 21b as a converter, a multimode optical fiber (MMF) 21c, and an opto-electric converter 21d. The vehicle exterior antenna 21a is an antenna that transmits and receives electric signals to and from an object for communication in the exterior of the vehicle 2. The vehicle exterior antenna 21a is provided at a position that enables communication with the exterior object for communication in the exterior of the vehicle 2 (outside a roof, for example) or the like and receives the radio wave (electric signal) transmitted from the cloud system 10. In this example, the exterior of the vehicle 2 is a part outside the body of the vehicle 2, whereas the interior of the vehicle 2 is a part inside the body of the vehicle 2.

The electro-optic converter 21b is a circuit that converts an electric signal into an optical signal. The electro-optic converter 21b is provided in the exterior of the vehicle 2 and is connected to the vehicle exterior antenna 21a. The electro-optic converter 21b converts an electric signal received by the vehicle exterior antenna 21a into an optical signal. The electro-optic converter 21b includes a signal power adjusting circuit 21e, a bias tee 21f, and a surface emitting laser 21g. The signal power adjusting circuit 21e is a circuit adjusting the power of the electric signal. The signal power adjusting circuit 21e is connected to the vehicle exterior antenna 21a and amplifies the electric signal received by this vehicle exterior antenna 21a, for example. The signal power adjusting circuit 21e outputs the amplified electric signal to the bias tee 21f. The bias tee 21f is a circuit adding a direct current (DC) component. The bias tee 21f is connected to the signal power adjusting circuit 21e and outputs an electric signal obtained by adding the DC component to the AC electric signal amplified by the signal power adjusting circuit 21e to the surface emitting laser 21g. The surface emitting laser 21g is a semiconductor laser converting an electric signal into an optical signal. The surface emitting laser 21g is a vertical cavity surface emitting laser (VCSEL), for example. The surface emitting laser 21g is connected to the bias tee 21f, converts the electric signal output from the bias tee 21f into an optical signal, and outputs the optical signal to the multimode optical fiber 21c.

The multimode optical fiber 21c is an optical fiber transmitting optical signals. The multimode optical fiber 21c connects the electro-optic converter 21b and the on-vehicle device (the opto-electric converter 21d, the on-vehicle router 23, and the like) in the interior of the vehicle 2. One end of the multimode optical fiber 21c is connected to the electro-optic converter 21b, whereas the other end thereof is connected to opto-electric converter 21d. The multimode optical fiber 21c, with its optical axis adjusted by an optical axis adjusting unit (not illustrated), is connected to the electro-optic converter 21b and the opto-electric converter 21d. The multimode optical fiber 21c is made of glass or plastic (resin) and is preferably made of plastic (resin). The multimode optical fiber 21c includes a core layer (not illustrated) through which optical signals propagate and a clad layer (not illustrated) surrounding the core layer, for example. In the multimode optical fiber 21c, optical signals are reflected by a boundary surface between the core layer and the clad layer at certain angles, whereby the optical signals propagate through the core layer. The multimode optical fiber 21c has a plurality of angles at which the optical signals are reflected and thereby has a plurality of propagation modes for propagation of the optical signals. The multimode optical fiber 21c includes a plurality of types such as a step-index multimode optical fiber and a graded-index multimode optical fiber. The step-index multimode optical fiber has a constant refractive index of the core layer, in which the optical signals propagate at different speeds for each of the propagation modes. The graded-index multimode optical fiber has a smoothly distributed refractive index of the core layer, in which the optical signals propagate at a similar speed for each of the propagation modes.

The opto-electric converter 21*d* is a circuit converting an optical signal into an electric signal. The opto-electric converter 21*d* is provided in the interior of the vehicle 2 and is connected to the multimode optical fiber 21*c*. The opto-electric converter 21*d* converts an optical signal that has propagated through the multimode optical fiber 21*c* into an electric signal. The opto-electric converter 21*d* includes a light-receiving element 21*h* and a signal power adjusting circuit 21*i*. The light-receiving element 21*h* is a photodiode converting an optical signal into an electric signal, for example. The light-receiving element 21*h* is connected to the multimode optical fiber 21*c*, converts the optical signal that has propagated through the multimode optical fiber 21*c* into the electric signal, and outputs the electric signal to the signal power adjusting circuit 21*i*. The signal power adjusting circuit 21*i* is a circuit adjusting the power of the electric signal. The signal power adjusting circuit 21*i* is connected to the light-receiving element 21*h* and amplifies the electric signal converted by the light-receiving element 21*h*, for example. The signal power adjusting circuit 21*i* outputs the amplified electric signal (reception signal) to the on-vehicle router 23. In this example, the reception signal includes traffic obstacle information representing traffic accidents, road obstacles, construction, and the like and traffic regulation information representing speed regulation, lane regulation, suspension of traffic, and the like, for example.

Figure 4:
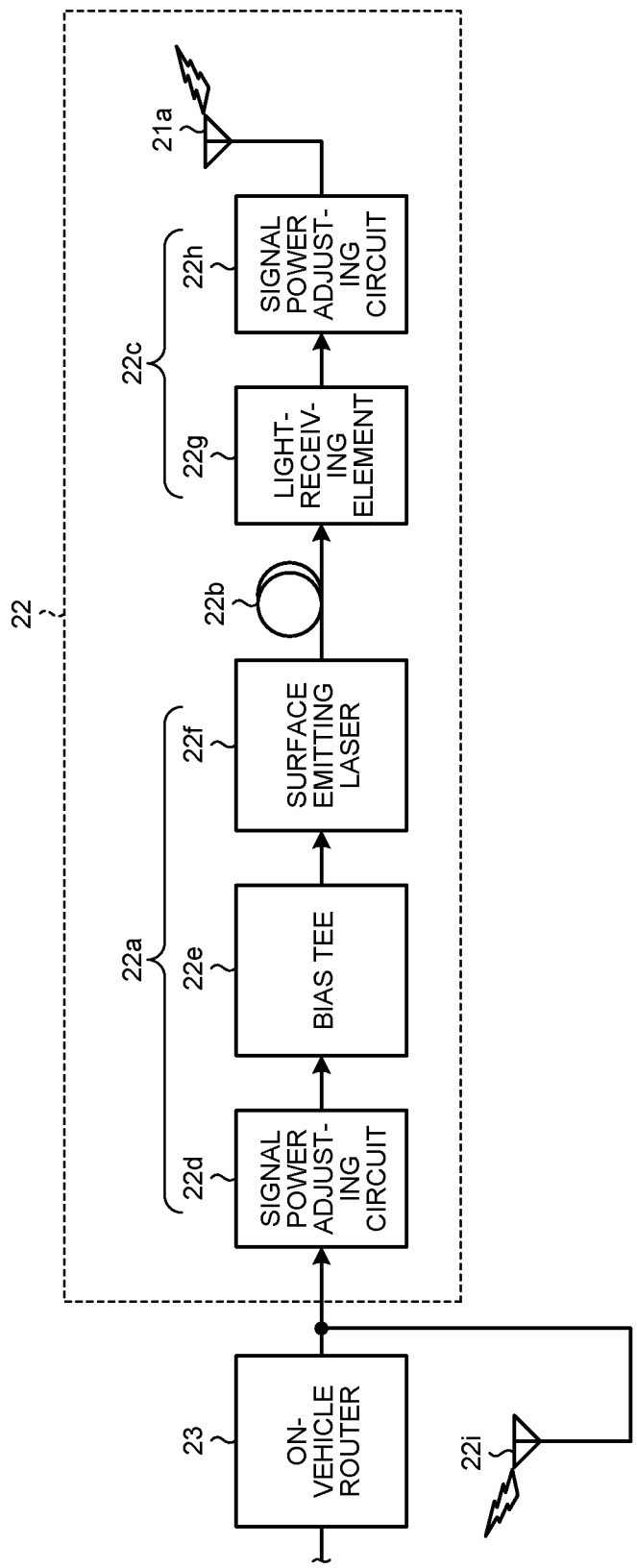
FIG. 4 is a block diagram of a configuration example of an RoF transmitting device according to the embodiment.

The RoF transmitting device 22 is an device that converts an electric signal output from the on-vehicle device into an optical signal and transmits the optical signal to the exterior of the vehicle 2. As illustrated in FIG. 4, the RoF transmitting device 22 includes an electro-optic converter 22*a* as a converter, a multimode optical fiber 22*b*, an opto-electric converter 22*c*, and a vehicle exterior antenna 21*a* as an antenna. Components of the RoF transmitting device 22 equivalent to those of the RoF receiving device 21 are denoted by the same symbols, and detailed descriptions thereof are omitted.

The electro-optic converter 22*a* is provided in the interior of the vehicle 2 and is connected to the on-vehicle router 23. The electro-optic converter 22*a* converts an electric signal output from the on-vehicle router 23 into an optical signal. The electro-optic converter 22*a* includes a signal power adjusting circuit 22*d* connected to the on-vehicle router 23, a bias tee 22*e* connected to the signal power adjusting circuit 22*d*, and a surface emitting laser 22*f* connected to the bias tee 22*e*. The multimode optical fiber 22*b* connects the on-vehicle device (the electro-optic converter 22*a*, the on-vehicle router 23, and the like) in the interior of the vehicle 2 and the opto-electric converter 22*c*.

The opto-electric converter 22*c* is provided in the exterior of the vehicle 2 and is connected to the multimode optical fiber 22*b* and the vehicle exterior antenna 21*a*. The opto-electric converter 22*c* converts an optical signal that has propagated through the multimode optical fiber 22*b* into an electric signal and outputs the converted electric signal to the vehicle exterior antenna 21*a*. The opto-electric converter 22*c* includes a light-receiving element 22*g* connected to the multimode optical fiber 22*b* and a signal power adjusting circuit 22*h* connected to the light-receiving element 22*g*.

The signal power adjusting circuit 22*h* outputs the amplified electric signal (transmission signal) to the vehicle exterior antenna 21*a*. The vehicle exterior antenna 21*a* transmits the electric signal output from the signal power adjusting circuit 22*h* to the cloud system 10.

The on-vehicle router 23 is a device that relays (transfers) electric signals to and from an object for transfer provided in the interior. The on-vehicle router 23 is connected to the RoF receiving device 21 and a C/B 24 and transfers the reception signal output from the RoF receiving device 21 to the C/B 24. The on-vehicle router 23 is connected to the RoF transmitting device 22 and transfers a transmission signal output from the C/B 24 to the RoF transmitting device 22.

A plurality of C/Bs 24 are provided in the vehicle 2. The C/Bs 24 are installed for each of a plurality of areas of the vehicle 2 sectioned in accordance with the assembled structure of the vehicle 2. Various kinds of sensors and the like (not illustrated) are connected to the C/Bs 24, which control the various kinds of sensors and the like. In the connection with the various kinds of sensors and the like and the connection between the C/Bs 24, the C/Bs 24 are connected by transmission paths including the multimode optical fibers 21*c* and 22*b*, for example. For the various kinds of sensors, their electric signals to be output are adapted to the communication standard of the fifth-generation mobile communication system (5G), thereby eliminating decoding processing for converting between signal formats, and in addition, versatile intermediate frequency (IF) is adopted, thereby making them inexpensive devices.

The integrated safety support ECU 25 is an electronic control unit and includes an electronic circuit mainly including a known microcomputer including a CPU, a read-only memory (ROM) and a random-access memory (RAM) included in a storage unit and an interface. The integrated safety support ECU 25 is an device supporting the safety of the vehicle 2 and is connected to one of the C/Bs 24. The integrated safety support ECU 25 is connected to the C/B 24 by a transmission path including the multimode optical fibers 21*c* and 22*b*, for example. The integrated safety support ECU 25 displays and notifies the user of traffic obstacle information, traffic regulation information, and the like on a display of the vehicle 2 based on the reception signal, for example.

The following describes an operation example of the communication network system 1. The edge server 13 of the communication network system 1 transmits an electric signal including roadside and road surface data to the communication system 20 of the vehicle 2. The RoF receiving device 21 of the communication system 20 receives the electric signal transmitted from the edge server 13 via the vehicle exterior antenna 21*a*. The RoF receiving device 21 converts the reception signal (electric signal) received via the vehicle exterior antenna 21*a* into an optical signal by the electro-optic converter 21*b* and transmits the converted optical signal to the opto-electric converter 21*d* via the multimode optical fiber 21*c*. The RoF receiving device 21 converts the optical signal that has propagated through the multimode optical fiber 21*c* into an electric signal and outputs the converted electric signal to the on-vehicle router 23. The RoF transmitting device 22 converts the electric signal output via the on-vehicle router 23 into an optical signal by the electro-optic converter 22*a* and transmits the converted optical signal to the opto-electric converter 22*c* via the multimode optical fiber 22*b*. The RoF transmitting device 22 converts the optical signal that has propagated through the multimode optical fiber 22*b* into an electric signal by the opto-electric converter 22c and transmits the converted electric signal to the cloud system 10 via the vehicle exterior antenna 21a.

As described above, the communication system 20 according to the embodiment includes the vehicle exterior antenna 21a, the electro-optic converter 21b of the RoF receiving device 21, the opto-electric converter 22c of the RoF transmitting device 22, and the multimode optical fibers 21c and 22b. The vehicle exterior antenna 21a transmits and receives electric signals to and from the cloud system 10 in the exterior of the vehicle 2. The electro-optic converter 21b of the RoF receiving device 21 is connected to the vehicle exterior antenna 21a and converts the electric signal received by the vehicle exterior antenna 21a into the optical signal. The opto-electric converter 22c of the RoF transmitting device 22 converts the optical signal into the electric signal and outputs the electric signal after being converted to the vehicle exterior antenna 21a. The multimode optical fiber 21c has a plurality of propagation modes for propagation of optical signals and connects the electro-optic converter 21b of the RoF receiving device 21 and the on-vehicle device (the opto-electric converter 21d, the on-vehicle router 23, and the like) in the interior of the vehicle 2. The multimode optical fiber 22b connects the opto-electric converter 22c of the RoF transmitting device 22 and the on-vehicle device (the electro-optic converter 22a, the on-vehicle router 23, and the like) in the interior of the vehicle 2.

Figure 5:
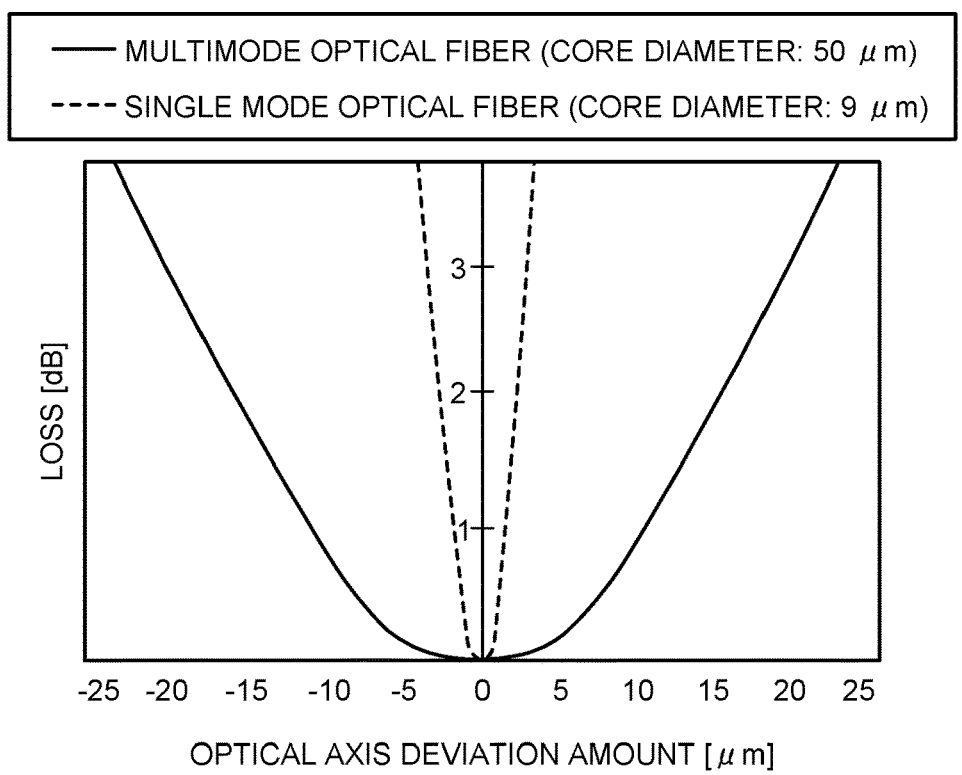
FIG. 5 is a diagram of relation between an optical axis deviation amount and loss according to the embodiment.

With this configuration, the communication system 20 can optically transmit the reception signal received from the cloud system 10, for example, and can reduce signal attenuation compared with a case of electric communication by a conventional electric wire such as a coaxial cable. In particular, the communication system 20 produces a marked effect of reducing attenuation in the case of a high-frequency signal of about 6 GHz to about 90 GHz. In addition, the communication system 20 uses the multimode optical fibers 21c and 22b as transmission paths, can thereby reduce loss caused by optical axis deviation compared with a single mode optical fiber, and can improve connectivity with the electro-optic converters 21b and 22a and the opto-electric converters 21d and 22c. As illustrated in FIG. 5, the multimode optical fibers 21c and 22b is less in loss relative to an optical axis deviation amount than the single mode optical fiber. The single mode optical fiber has a loss of about 2 dB for an optical axis deviation amount of about 2 μm, for example. In contrast, the multimode optical fibers 21c and 22b have a loss of about 0.1 dB for an optical axis deviation amount of about 2 μm. The multimode optical fibers 21c and 22b can thus reduce loss relative to the optical axis deviation amount compared with the single mode optical fiber. In this example, the diameter of the core layer of the multimode optical fibers 21c and 22b is set to 50 μm, whereas the diameter of the core layer of the single mode optical fiber having one propagation mode is set to 9 μm. The communication system 20 can achieve reduction in attenuation and improvement in connectivity and can thus appropriately transmit and receive signals between the edge server 13 in the exterior of the vehicle 2 and the on-vehicle device in the interior of the vehicle 2. The communication system 20 uses the multimode optical fibers 21c and 22b, can thus reduce noise interference, can ensure a wide band, and can achieve weight reduction.

In the communication system 20, the on-vehicle device includes the on-vehicle router 23 that relays electric signals to and from the object for transfer provided in the interior. When a reception signal is received, the on-vehicle device has the opto-electric converter 21d; this opto-electric converter 21d is connected to the multimode optical fiber 21c and the on-vehicle router 23, converts the optical signal output via the multimode optical fiber 21c into the electric signal, and outputs the converted electric signal to the on-vehicle router 23. When a transmission signal is transmitted, the on-vehicle device has the electro-optic converter 22a; this electro-optic converter 22a is connected to the on-vehicle router 23 and the multimode optical fiber 22b, converts the electric signal relayed by the on-vehicle router 23 into the optical signal, and outputs the converted optical signal to the multimode optical fiber 22b. With this configuration, the communication system 20 can favorably perform optical communication from the vehicle exterior antenna 21a to the on-vehicle router 23.

In the communication system 20, the electro-optic converter 21b converts the electric signal into the optical signal without performing analog/digital conversion (A/D conversion). With this configuration, the communication system 20 can omit a conversion time for performing A/D conversion and can thus reduce delay in signal transmission.

The communication system 20 is used for the vehicle 2 and can thus favorably communicate with the cloud system 10 in the fifth-generation mobile communication system.

Figure 6:
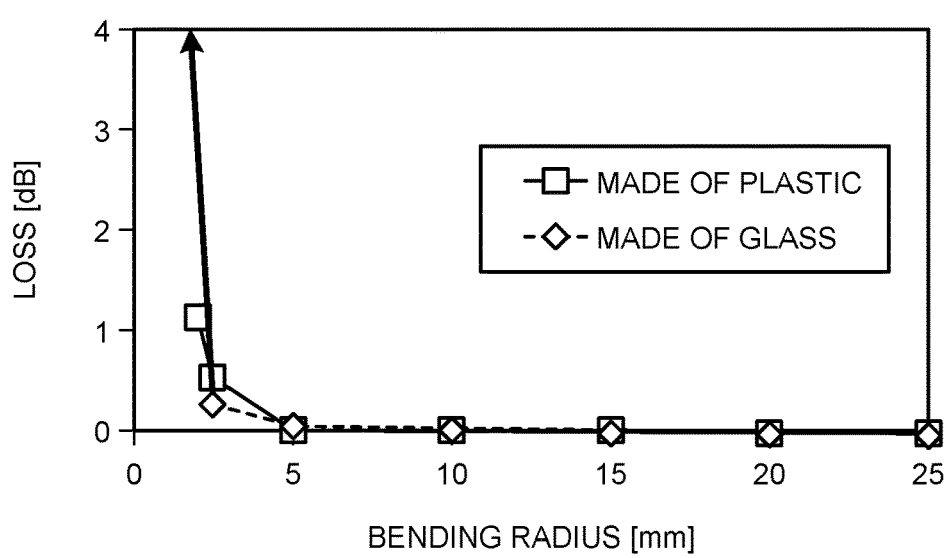
FIG. 6 is diagram of a comparison example of a bending radius according to the embodiment.

In the communication system 20, using the multimode optical fibers 21c and 22b made of plastic, routability can be improved. As illustrated in FIG. 6, the multimode optical fibers 21c and 22b made of plastic have stronger bending resistance than the multimode optical fibers 21c and 22b made of glass. The multimode optical fibers 21c and 22b made of glass break at a bending radius of about 2.5 mm, for example. In contrast, the multimode optical fibers 21c and 22b made of plastic do not break at a bending radius of about 2.5 mm and can also reduce loss caused by bending compared with the multimode optical fibers 21c and 22b made of glass. Based on this comparison, the multimode optical fibers 21c and 22b made of plastic, which are less in bending loss and favorable in routability, are preferably used for the vehicle 2.

First Modification

Figure 7:
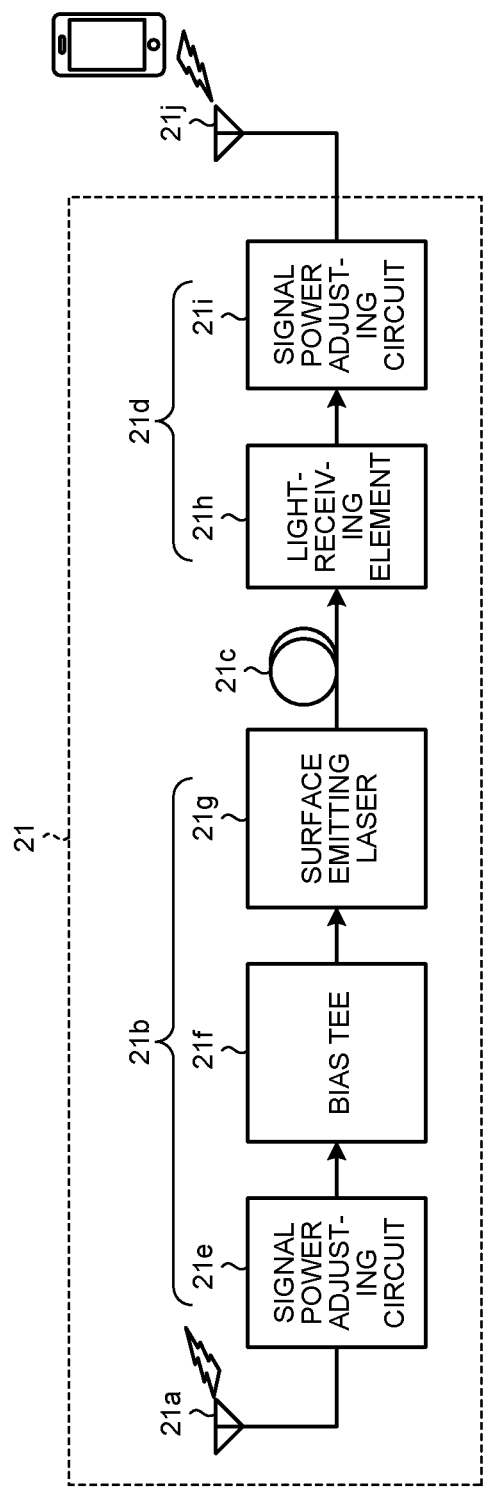
FIG. 7 is a block diagram of a configuration example of the RoF receiving device according to a modification.

The following describes first and second modifications of the embodiment. For the first and second modifications, the same components as those of the embodiment are denoted by the same symbols, and detailed descriptions thereof are omitted. The RoF receiving device 21 according to the first modification is different from that of the embodiment in that the reception signal received from the cloud system 10 is radiated within the vehicle 2. As illustrated in FIG. 7, in the RoF receiving device 21, the opto-electric converter 21d is connected to a vehicle interior antenna 21j as an interior antenna. The vehicle interior antenna 21j radiates an electric signal output from the signal power adjusting circuit 21i of the opto-electric converter 21d to the interior of the vehicle 2. Various kinds of sensors and the like provided in the interior of the vehicle 2 receive the reception signal radiated from the vehicle interior antenna 21j.

As described above, in the communication system 20, the on-vehicle device according to the first modification includes the vehicle interior antenna 21j that is provided in the interior to transmit and receive electric signals. When a reception signal is received, the on-vehicle device has the opto-electric converter 21d; this opto-electric converter 21d is connected to the multimode optical fiber 21c and the vehicle interior antenna 21j, converts the optical signal output via the multimode optical fiber 21c into the electric signal, and outputs the converted electric signal to the vehicle interior antenna 21j. When a transmission signal is transmitted, the on-vehicle device has the electro-optic converter 22a; this electro-optic converter 22a is connected to a vehicle interior antenna 22i (refer to FIG. 4) and the multimode optical fiber 22b, converts an electric signal received by the vehicle interior antenna 22i into an optical signal, and outputs the converted optical signal to the multimode optical fiber 22b. With this configuration, the communication system 20 can reradiate the reception signal from the vehicle interior antenna 21j toward the various kinds of sensors and the like in the interior of the vehicle 2. In particular, when receiving a reception signal of a millimeter wave as a high-frequency wave from the cloud system 10, the millimeter wave has strong directivity and the property of being shielded and is thus difficult to reach the inside of the vehicle 2; the communication system 20 reradiates the reception signal to the interior of the vehicle 2 and can thereby transmit the reception signal, even if it is a millimeter wave, to the inside of the vehicle 2 similarly to a radio wave that is low in frequency and reaches the inside of the vehicle 2. In addition, the communication system 20 transmits the reception signal wirelessly from the vehicle interior antenna 22i toward the various kinds of sensors and the like in the interior of the vehicle 2 and can thus reduce the number of electric wires. In addition, the communication system 20 performs opto-electric conversion on the signal received by the vehicle interior antenna 22i from the various kinds of sensors and the like in the interior of the vehicle 2 to perform optical communication and can thus reduce the number of electric wires also at the time of transmission.

Second Modification

The following describes an RoF receiving device 21A according to the second modification. The RoF receiving device 21A according to the second modification is different from that of the embodiment in that the opto-electric converter 21d causes the reception signal to branch to transmit the reception signal to a plurality of nodes. As illustrated in FIG. 8, the RoF receiving device 21A includes the electro-optic converter 21b, the multimode optical fiber 21c, an optical coupler 21k, and the opto-electric converter 21d. The opto-electric converter 21d includes a first communication node 21m and a second communication node 21n. The optical coupler 21k is connected to the multimode optical fiber 21c to cause the optical signal that has propagated through the multimode optical fiber 21c to branch to the first communication node 21m and the second communication node 21n. The first communication node 21m includes the light-receiving element 21h and the signal power adjusting circuit 21i, converts the optical signal into an electric signal by the light-receiving element 21h, amplifies the electric signal by the signal power adjusting circuit 21i, and outputs the electric signal to the on-vehicle router 23. The second communication node 21n includes the light-receiving element 21h, the signal power adjusting circuit 21i, and the vehicle interior antenna 21j, converts the optical signal into an electric signal by the light-receiving element 21h, amplifies the electric signal by the signal power adjusting circuit 21i, and reradiates the electric signal to the interior of the vehicle 2 by the vehicle interior antenna 21j. The RoF receiving device 21A according to the second modification causes the reception signal to branch to the first communication node 21m and the second communication node 21n by the optical coupler 21k. With this configuration, the communication system 20 can transmit the reception signal to a plurality of communication nodes.

Although described is an example in which the communication system 20 includes the RoF receiving device 21 and the RoF transmitting device 22, at least either the RoF receiving device 21 or the RoF transmitting device 22 may be included.

Although described is an example in which the C/Bs 24 are connected by the transmission paths including the multimode optical fibers 21c and 22b in the connection with the on-vehicle router 23 and the connection between the C/Bs 24, this is not limiting; the C/Bs 24 may be connected by single mode optical fibers or be connected by electric wires such as coaxial cables in the connection between the C/Bs 24 and the like.

Although described is an example in which the integrated safety support ECU 25 is connected to the C/B 24 by the transmission path including the multimode optical fibers 21c and 22b, this is not limiting; the integrated safety support ECU 25 may be connected to the C/B 24 by a single mode optical fiber or be connected to the C/B 24 by an electric wire such as a coaxial cable.

The electro-optic converter 21b and the opto-electric converter 21d may each include a frequency converter for reducing frequency.

The RoF receiving device 21 may be used for buildings such as multistoried buildings and houses as the structure.

Although described is an example in which the communication network system 1 performs wireless communication at a high frequency of about 6 GHz to about 90 GHz, this is not limiting; wireless communication may be performed at a frequency other than the high frequency.

The transmission paths other than the transmission path connecting the vehicle exterior antenna 21a and the on-vehicle router 23 may include waveguides and radio wave hoses in addition to electric wires such as coaxial cables and optical fibers.

The second modification describes a case in which the communication system 20 causes the reception signal received from the cloud system 10 to branch using the optical coupler 21k. When causing a transmission signal to be transmitted to the cloud system 10 to branch using an optical coupler (not illustrated), transmission signals from a plurality of communication nodes interfere with each other, and the communication system 20 assigns wavelengths for each of the communication nodes and performs wavelength division multiplexing to reduce the interference among the transmission signals.

The communication system according to the present embodiment includes a multimode optical fiber that connects a converter connected to the exterior antenna and a device in the interior of a structure and can thus appropriately transmit and receive signals between a communication device in the exterior of the structure and the device in the interior of the structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication system comprising:
   an antenna that transmits and receives an electric signal to and from an object for communication in an exterior of a structure;
   a converter that is connected to the antenna and converts the electric signal received by the antenna into an optical signal or converts an optical signal into an electric signal and outputs the electric signal after being converted to the antenna; and a multimode optical fiber that connects the converter and a device in an interior of the structure and has a plurality of propagation modes for propagation of optical signals, the device includes an interior antenna that is provided in the interior and transmits and receives an electric signal, when the converter converts the electric signal into the optical signal, the device includes an opto-electric converter that is connected to the multimode optical fiber and the interior antenna, converts an optical signal output via the multimode optical fiber into an electric signal, and outputs the converted electric signal to the interior antenna, and when the converter converts the optical signal into the electric signal, the device includes an electro-optic converter that is connected to the interior antenna and the multimode optical fiber, converts an electric signal received by the interior antenna into an optical signal, and outputs the converted optical signal to the multimode optical fiber.

2. The communication system according to claim 1, wherein the converter converts the electric signal into the optical signal without performing analog/digital conversion.

3. The communication system according to claim 2, wherein the structure is a vehicle.

4. The communication system according to claim 1, wherein the structure is a vehicle.

* * * * *